United States Patent [19]
Sromin et al.

[11] Patent Number: 6,037,696
[45] Date of Patent: Mar. 14, 2000

[54] PERMANENT MAGNET AXIAL AIR GAP ELECTRIC MACHINE

[75] Inventors: Alexander Sromin; Alexander Altfeld, both of Rehovot; Moshe Hiterer, Jerusalem; David Nimirovsky, Azor, all of Israel

[73] Assignee: Samot Engineering (1992) Ltd., Nes Ziona, Israel

[21] Appl. No.: 08/175,078

[22] Filed: Dec. 29, 1993

[51] Int. Cl.[7] .................................................. H02K 1/22
[52] U.S. Cl. ...................... 310/268; 310/112; 310/113; 310/114; 310/156
[58] Field of Search .................. 310/268, 156, 310/114, 112, 178, 162, 177, 233

[56] References Cited

U.S. PATENT DOCUMENTS

| | | | |
|---|---|---|---|
| 3,230,406 | 1/1966 | Henry-Baudot | 310/156 |
| 3,293,470 | 12/1966 | Polgreen | 310/178 |
| 3,310,695 | 3/1967 | Kober | 310/156 |
| 4,477,745 | 10/1984 | Lux | 310/156 |
| 4,551,645 | 11/1985 | Takahashi et al. | 310/156 |
| 4,682,067 | 7/1987 | Oudet | 310/156 |
| 4,835,840 | 6/1989 | Stokes | 310/156 |
| 4,891,538 | 1/1990 | Oudet | 310/162 |
| 4,996,457 | 2/1991 | Hawsey et al. | 310/112 |
| 5,117,141 | 5/1992 | Hawsey et al. | 310/114 |
| 5,184,040 | 2/1993 | Lim | 310/156 |
| 5,220,232 | 6/1993 | Rigney, II et al. | 310/156 |

*Primary Examiner*—Elvin Enad
*Attorney, Agent, or Firm*—Mark M. Friedman

[57] ABSTRACT

A rotor for use in an electric machine, such as an electric motor having a pair of stators and a rotor, which includes a central sheet, typically connected to a rotating shaft, having a pair of opposing faces, typically parallel, and one or more pairs of permanent magnets. The magnets of each pair of magnets are connected to the central sheet directly or nearly opposite from each other on opposing faces of the central sheet. The pair of magnets are mounted so that their polar orientation is co-directional.

20 Claims, 8 Drawing Sheets

PERMANENT MAGNET AXIAL AIR GAP ELECTRIC MACHINE

FIELD AND BACKGROUND OF THE INVENTION

The present invention relates to axial magnetic field electric machines, such as motors, generators, tachogenerators, and the like, and, more particularly, to a axial magnetic field electric machines employing permanent magnet rotor.

Electric machines employing permanent magnets have been known for many years. Recently considerable progress has been made in such machines with the increased quality and reduced prices of rare-earth metal magnets, such as Sm-Co, Nd-Fe-B, and the like. Such machines are currently available which are capable of reaching the low torque range as well as several tens of Newtonometers.

Applications with more rigorous space-saving requirements, such as in robotics, machine-tools, electric automobiles, and the like, generally require disc-shaped machines, especially axial air-gap motor and generators.

Various configurations of axial air-gap machines are currently known, including machines with separated permanent magnets on the rotor, with a single piece magnetized rotor, with toothed and slide cores, single or multiple rotor and stator design, with sector or toroidal windings, and the like.

Some of these configurations are disclosed in U.S. Pat. Nos. 4,835,840 (to Stokes), 5,117,141 (to Hawsey et al.) and 4,996,457 (to Hawsey et al).

U.S. Pat. No. 4,835,840 describes disc rotor assembly which includes a ring of magnetic flux conducting material having a ring-shaped magnetizable body fastened thereon. The device includes a flat, axially facing, ring-shaped rotor surface for opposing a single stator. It is to be noted that such an assembly cannot be used in the more preferable two stator "sandwich" design and cannot utilize widely distributed flat magnet pieces.

U.S. Pat. No. 5,117,141 discloses several rotors for brushless DC motors. Each of these includes one or more sets of permanent magnets arranged in a ring configuration around the peripheral edge. The magnets are imbedded directly in a carrying disc and connected to each other without an intermediate structural element, such as a ring, a sheet, and the like. Besides, the above-referenced patent states that such rotors are to be used in drive units which cause rotation of two shafts in opposite directions, each shaft being connected to its rotor.

A disadvantage of such axial gap permanent magnet electrical machines, especially at the high rotational speeds, is that the rotor has a tendency to fail mechanically. The underlying reason for these failures is that rotors operate under strong cyclic force fields while the need to axially conduct magnetic flux makes it difficult to design a rigid carrying structure. Because such rotors tend to fail mechanically, requiring costly equipment downtime and expensive repair or replacement.

There is thus a widely recognized need for, and it would be highly advantageous to have, an axial gap electric machine employing permanent magnet rotors of rigid and firm design which would be more mechanically rugged and operationally reliable.

SUMMARY OF THE INVENTION

According to the present invention, there is provided a reliable axial magnetic field electric machine for various modes of operation, such as synchronous motor, alternator, gyroscope, tachogenerators, brushless DC motor, and the like.

In its simplest form, a machine according to the present invention includes a disc rotor placed between a pair of stators. The rotor is made up of a central member, or sheet, typically from 0.01 to 0.08 in. thick, onto each face of which a set of permanent magnets is attached. A magnetic flux of the permanent magnet set on one face of the central sheet is continued by the magnetic flux of the permanent magnet set on the other face of the central sheet and passes axially through the central sheet. Thus, the sheet magnetically connects the stators to each other.

BRIEF DESCRIPTION OF THE DRAWINGS

The invention is herein described, by way of example only, with reference to the accompanying drawings, wherein:

FIGS. 4a, 4b, 4c, 4d and 4e illustrate a variety of rotor schemes, each according to the present invention. The various schemes differ in magnetization consequences, field polarities, magnet pieces groupings, and the like. FIGS. 4a and 4b show a heteropolar and homopolar, respectively, rotor with equal opposing separated magnet pieces; FIG. 4c shows a rotor with diverse separated magnet pieces; FIG. 4d shows a rotor with slightly displaced magnet sets: FIG. 4e shows a rotor with multiple pieces poles design;

FIG. 4e' is a partial top view of a two-piece T pole; FIG. 4e" is a partial top view of a three-piece II pole;

DESCRIPTION OF THE PREFERRED EMBODIMENTS

The present invention is of an axial gap permanent magnet electric machine which includes an improved rotor.

The principles and operation of a machine according to the present invention may be better understood with reference to the drawings and the accompanying description.

Figure 1:
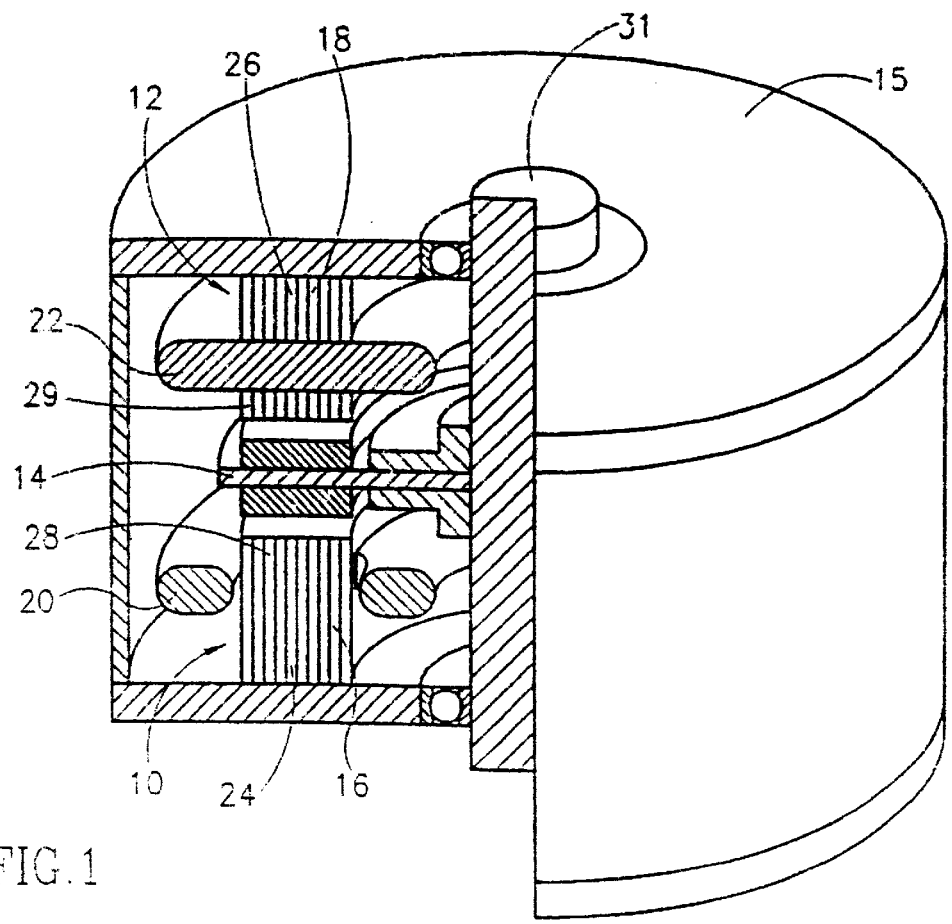
FIG. 1. is an isometric partial cross sectional view of an electric machine according to the present invention.

Referring now to the drawings, FIG. 1 illustrates a typical application of the present invention. It should be understood that while the present description deals primarily with electric machines of the type depicted in FIG. 1, the present invention is generally concerned with a wide variety of permanent magnet axial air-gap electric ones, all of which are intended to fall within the scope of the present invention.

The illustrative embodiment depicted in FIG. 1 includes a pair of stators 10 and 12, and a rotor 14 which is interposed between stators 10 and 12 as shown. To maximize the machine's efficiency, the air gap between rotor 14 and stators 10 and 12 should normally be as small as possible, for example, on the order of about 0.015 in. Each of stators 10 and 12 may, independently include a core member 16 and 18 and a wire member 20 and 22.

Core members 16 and 18 include a yoke layer 24 and 26 and can further include a toothed layer 28 and 29 in a case of a so-called slotted core. One stator may lack a wire member and a toothed layer and thus operate exclusively as a yoke. Toothed layers 28 and 29 may be fabricated from tape wounded silicon steel or from iron powder ceramics. The wire member contains radial active parts and is formed by conventional windings from insulated copper wires, printed circuit or by other possible methods.

In the wire members, which may be identical or may differ from each other, the distribution and interlinking of the windings may be identical to those in conventional electric machines. Since the magnetic flux in the stators is common, electromagnetic processes depend exclusively upon their currents. For example, in an electric machine operating as a brushless DC motor, torques generated by the first and the second stators are, respectively:

$$M_1 = C_1 * W_1 * \Phi * I_1$$

$$M_2 = C_2 * W_2 * \Phi * I_2$$

where, $C_1$ and $C_2$ are topological constants determined by phases number, distribution and interlinks of stators windings and phases commutation scheme;

$W_1$ and $W_2$ are windings number;

$\Phi$ is the common magnet flux; and $I_1$ and $I_2$ are currents flowing in the stators.

The stators can operate (be supplied) in parallel or separately, while the common magnet flux results in a mutual influence. This is why the phases of the stators to be conveniently connected in series.

Figure 2:
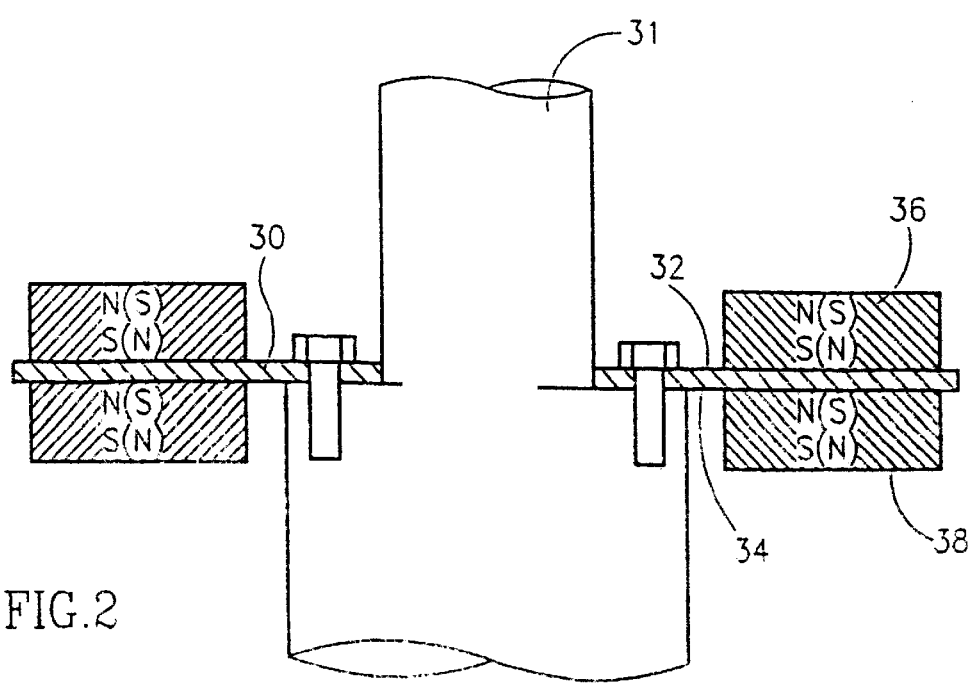
FIG. 2 schematically illustrates the rotor construction according to the present invention.

The electric machine typically includes a housing 15, a shaft 31 (FIG. 2), bearings (not designated), various sensors (not shown), cooling means (not shown), and the like.

The unique construction of rotor 14 lies at the heart of the present invention. The construction can be seen in FIG. 1 and, more clearly, in the schematic depiction of FIG. 2. Rotor 14 includes central sheet 30, which can have a wide variety of shapes, but which is preferably substantially disc shaped. Central sheet 30 is typically from about 0.01 to about 0.08 in. thick, and may be made of a single layer or of multiple layers. Central sheet 30 can be made from a magnetic or a non-magnetic material.

Figure 3A:
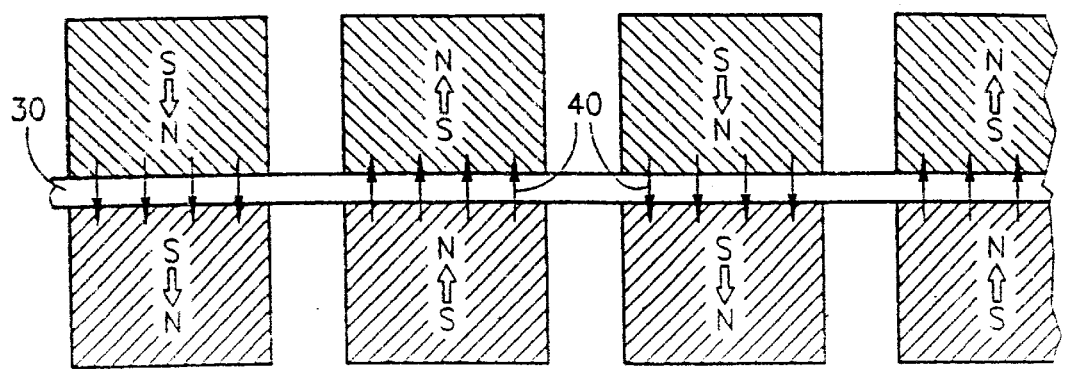
FIGS. 3a and 3b are unwrapped cross sectional views of a portion of the rotor structure, including the magnetic flux paths in the central sheet, according to the present invention (FIG. 3a) and according to U.S. Pat. No. 4,996,457 (FIG. 3b)

Central sheet 30 is suitably connected to, or is integrally formed with, a shaft 31. Central sheet 30 has two faces 32 and 34. Located on each of faces 32 and 34 are one or more flat permanent magnets 36 and 38, which are magnetized in the axial direction. Permanent magnets 36 and 38 are oriented such that a magnet, such as 36, located on one of the faces (in this example 32) must be magnetized in the same direction as the magnet (in this example 38) which is found directly on the other side of central sheet 30. Thus, as can best be seen in FIG. 3a, there is a common magnetic flux 40 along the thickness of sheet 30 which is generated by magnets opposite each other through central sheet 30.

U.S. Pat. No. 4,996,457 describes an ultra-high speed permanent magnet axial air-gap alternator with multiple stators. The heart of the invention disclosed therein is a disc rotor configuration wherein the rotor, which is situated between a pair of stators, has a set of permanent magnets on each surface of a central soft magnet disc which is from 0.25 to 0.5 in. thick. The disc serves as a magnetic isolator, separating the magnetic field of the permanent magnet set on one face of the disc from the field of the permanent magnets on the other face of the disc. As a result of this isolation, a load connected to one stator does not affect the load connected to the other stator.

Figure 3B:
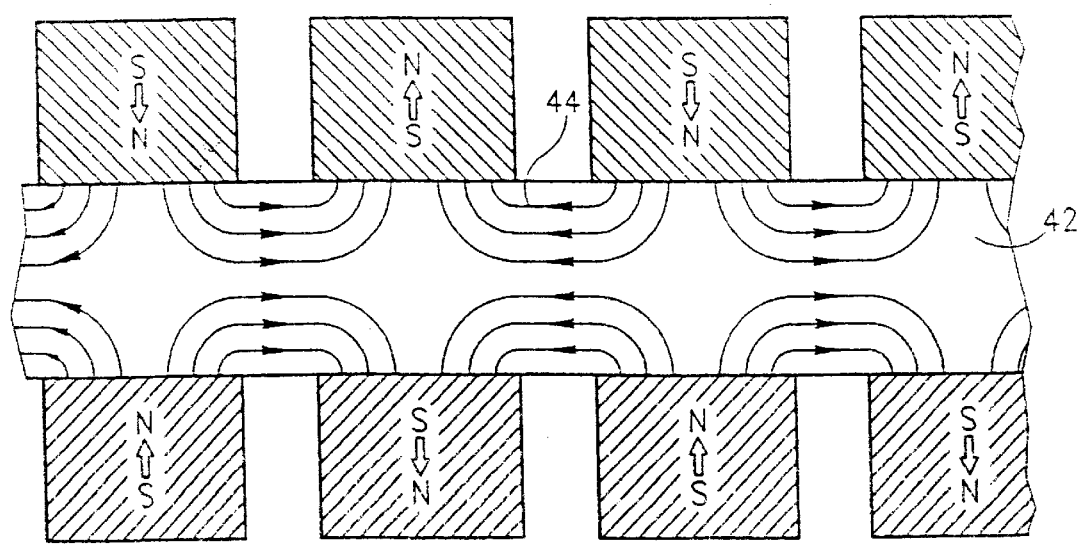

It is to be especially noted that the magnet field formed in a device according to the present rotor (FIG. 3a) is exactly opposite that formed in the rotor of the device disclosed in U.S. Pat. No. 4,996,457 (FIG. 3b). In the rotor to the above-referenced patent, the orientation corresponding magnets and the thickness and nature of the isolating disc 42 are such that an interpole magnet flux closure 44 is provided by its tangent flow. In sharp contrast, within a rotor according to the present invention there is no magnet circuit at all and magnet flux closure occurs exclusively in the stator yokes.

Figure 4A:
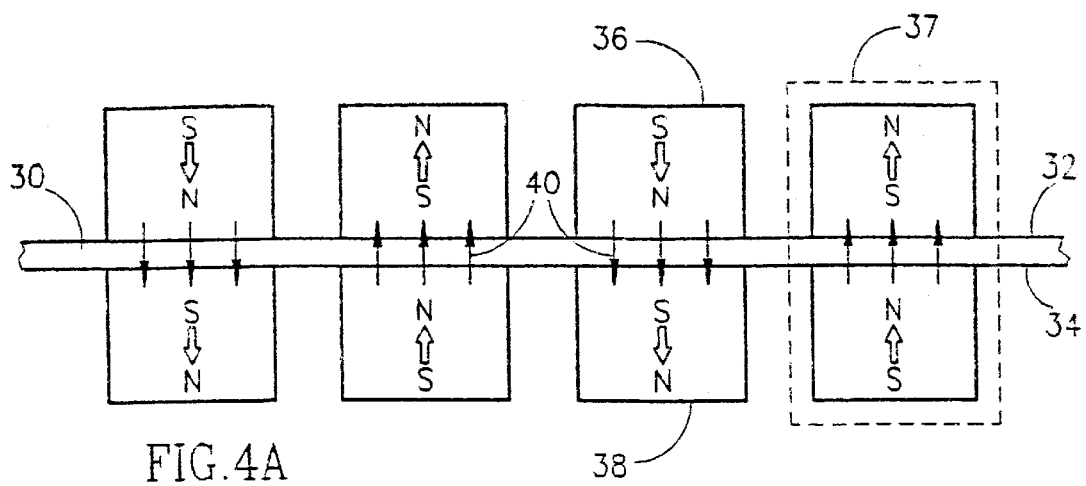

The specific magnetization directions and magnet pieces groupings within a rotor can be varied to achieve a wide variety of desirable polarities and field distributions, depending on the intended applications. For example, shown in FIG. 4a is a heteropolar rotor with equal opposing separate magnet pieces. Such a configuration is preferred for brushless DC and synchronous motors and alternators.

In this case, permanent magnets 36 and 38 on surfaces 32 and 34, respectively, are oriented to provide alternating polarities across central sheet 30. Thus, all the magnet pieces are divided into pairs 37, each of which supplying a magnetic flux 40 which is considered to pass through toothed layers of the stator (if they exist) or directly through the wire members of the stator and to produce circuit through the yoke parts.

Figure 4B:
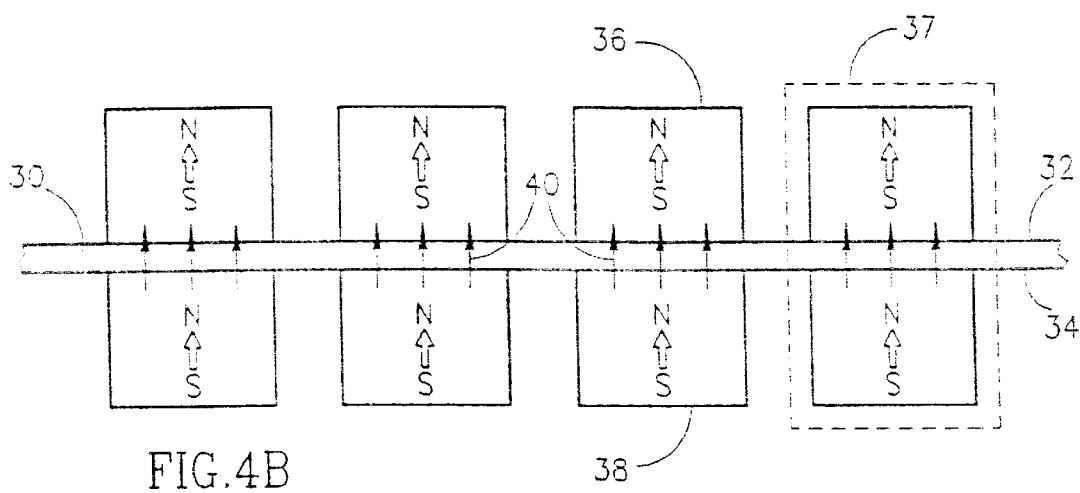

FIG. 4b depicts a homopolar rotor with equal separated opposing magnet pieces. Such a rotor may find application, for example, in homopolar low voltage DC machines. Permanent magnets 36 and 38 on surfaces 32 and 34, respectively, are magnetized in the same direction. All the magnet pieces are divided into pairs 37 supplying magnetic flux 40 which is considered to pass through the stator conductive discs and to produce circuit through the housing yoke.

Figure 4C:
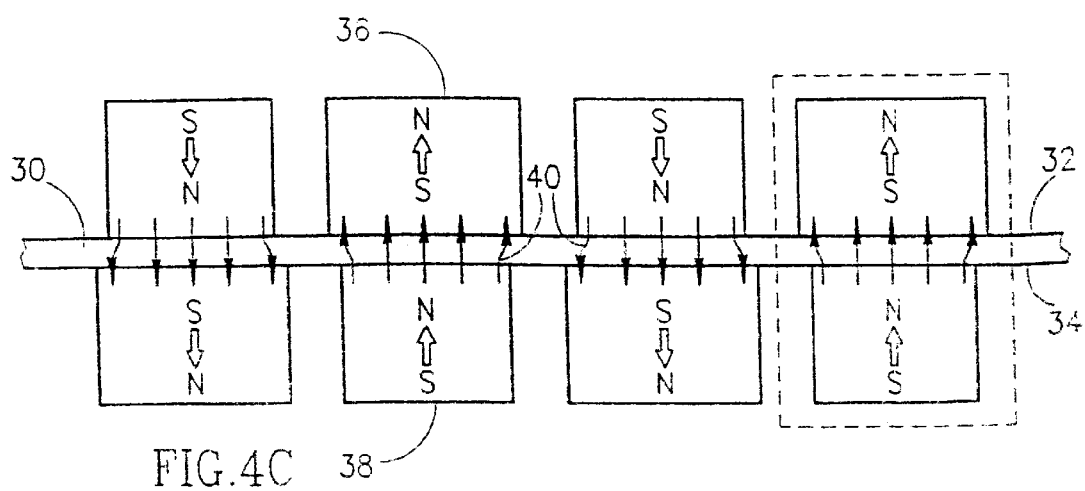

FIG. 4c shows a rotor with separated magnet pieces of different sizes. Such a configuration is useful, for example, to achieve low cogging brushless DC motor and alternators with improved voltage source. The magnetic flux 40 configuration is similar to that shown in FIG. 4a but the field distribution is less trapezoidal.

Figure 4D:
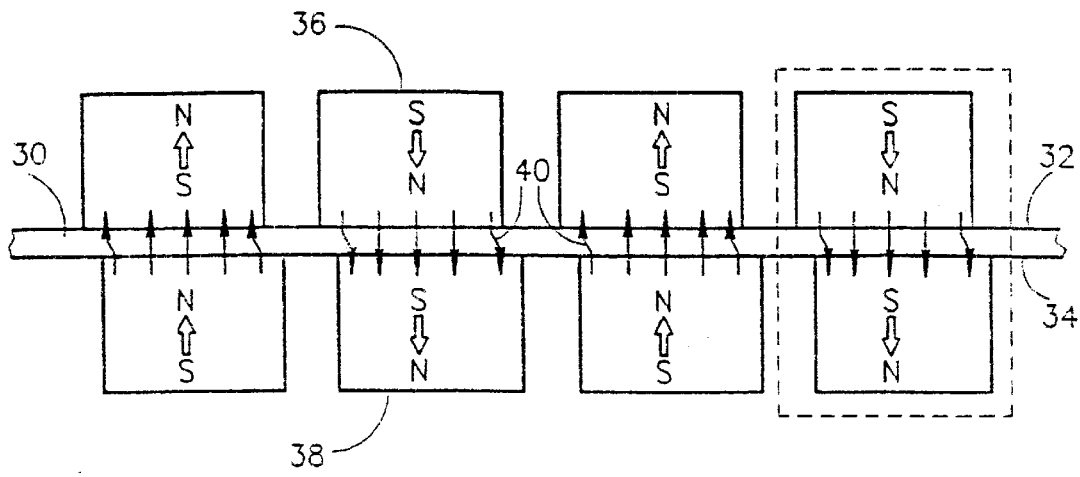

FIG. 4d shows a rotor with equal separated magnet pieces which are displaced from one another. Such a configuration is useful, for example, for low cogging brushless DC motor and alternators with improved voltage curve. Magnetic flux configuration 40 and its field distribution are similar to that of FIG. 4c but is created by unified magnets.

Figure 4E:
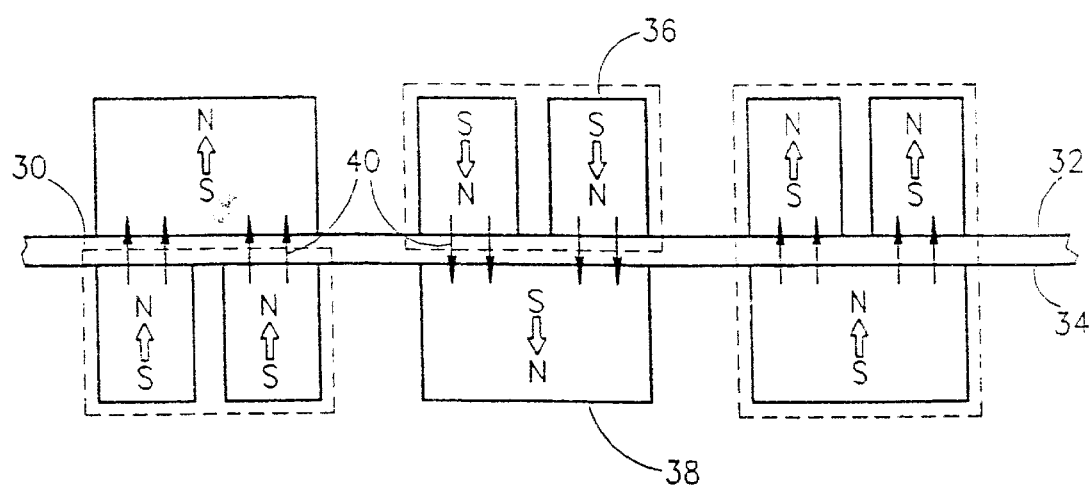

FIG. 4e shows a cross section of a rotor having multiple pieces poles design, e.g., FIG. 4e' shows a partial top view of a two-piece T pole while FIG. 4e" is a partial top view of a three-piece II pole. They can be employed in cost saving brushless DC motors and alternators. In the depicted example two permanent magnets form a single magnetization group. The polarities of the groups are co-directional across central sheet 30. Thus, all the magnet groups are divided into sets supplying magnetic flux 40 (as in the case of FIG. 4a) to pass through the toothed layers of the stator (if they exist) or directly through the wire members to produce a circuit through the yoke parts.

Another possible configuration is a rotor of solid magnet layer design, which includes two annular layers made of permanent magnet material lying directly on the top and bottom surfaces of the central sheet. Magnetization of the layers are identical each other and are oriented to create a common axial magnetic flux, either heteropolar or homopolar.

Figure 5A:
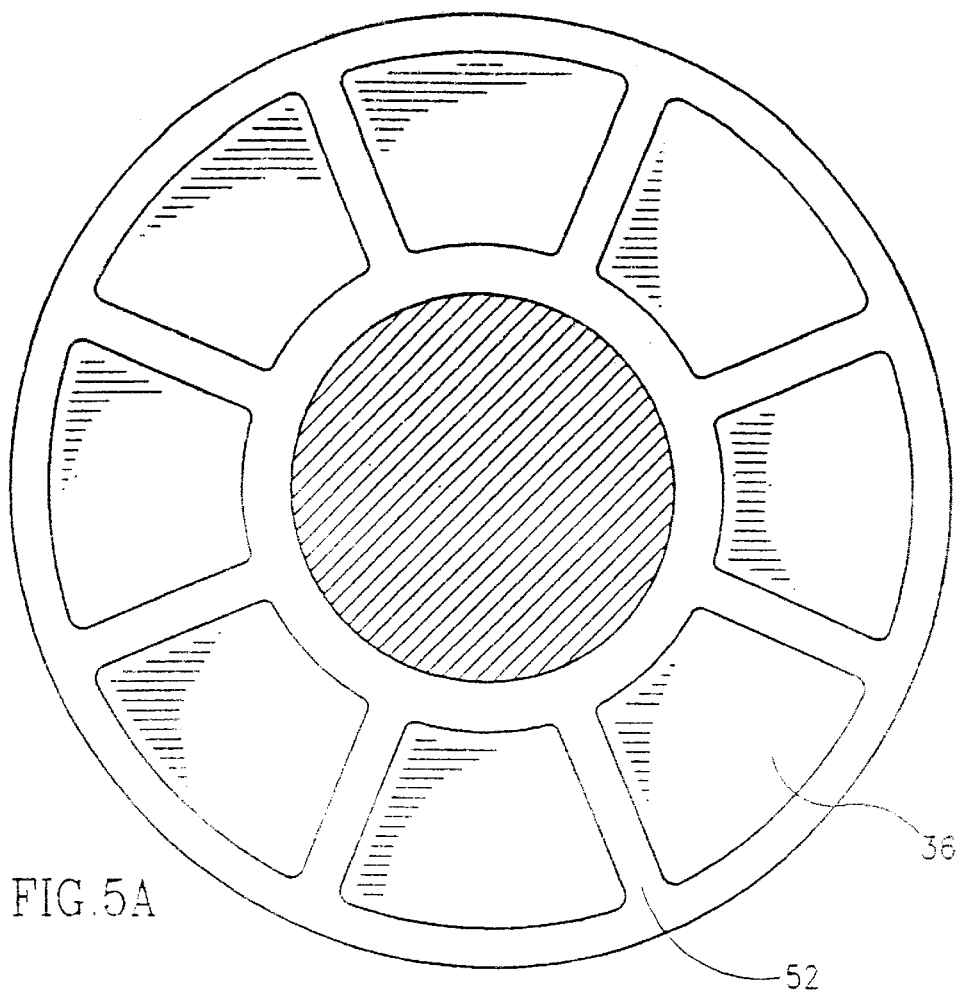
FIGS. 5a and 5b are a top view and a cross sectional view, respectively, of a rotor incorporating non-magnetic structural elements for additional mechanical strength.
Figure 5B:
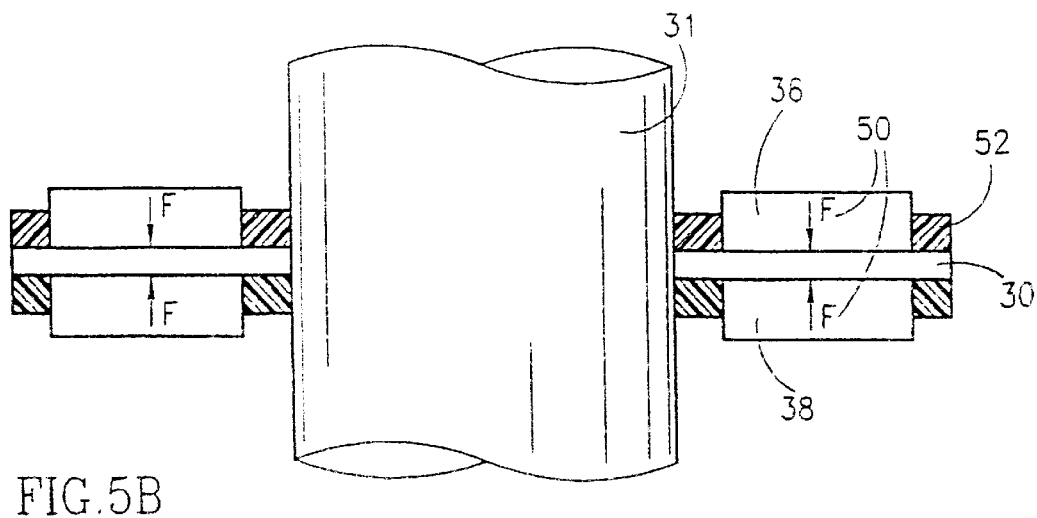

As is illustrated in FIG. 5b, because of the orientation of opposing co-directionally magnetized permanent magnets 36 and 38, sufficient interaction forces 50 directed as shown are present to press the two magnets firmly toward each other so as to tend to immobilize the magnets in position. To ensure that the magnets do not move from their optimal locations, it is preferably to use suitable adhesives 52, such as an appropriate anaerobic or epoxy adhesive, or to use welding, brazing, and the like, to more firmly immobilize the magnetic pieces. The connection can be made between the magnetic pieces themselves and central sheet surfaces and/or along their inner and/or outer perimeter (FIG. 5a).

Various schemes may be envisioned for immobilizing the magnetic pieces. Several of these are shown in FIGS. 6a–6d, 7a, 7b, 8a and 8b are described below.

Figure 6A:
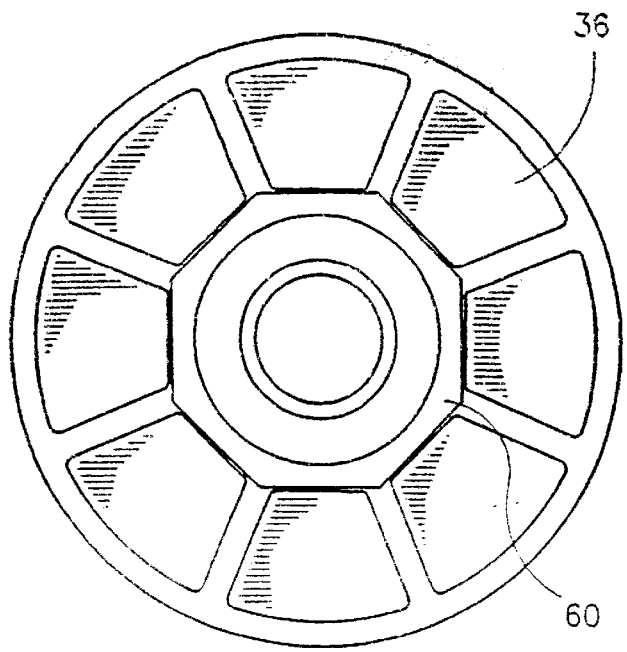
FIGS. 6a and 6b show top and cross-sectional views, respectively, of a rotor design based on a regular polygonal hub.
Figure 6B:
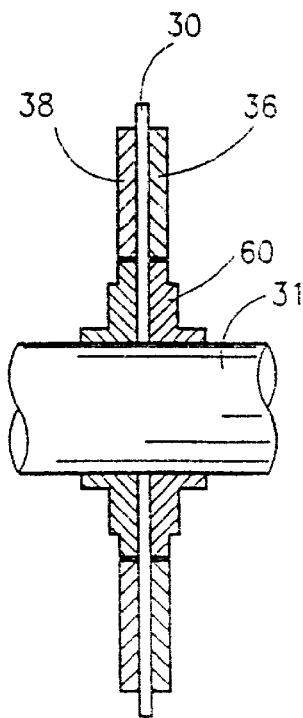

The configuration of FIGS. 6a and 6b offers an additional measure of rotor rigidity. Central sheet 30 is restrained by a braced hub 60 which may be, for example, in the shape of a polygon, star or another shape, such as the shape shown in FIGS. 7a and 7b. To build a solid rotor disk it is preferred to both bond the lateral faces of the magnet pieces to the edges of the polygonal hub and to adhere the flat portions of the magnetic pieces to the suffice of central sheet 30. Additionally or alternatively, the surfaces may be connected by welding or brazing joint along magnets perimeters, by surrounding of those by a non-magnetic adhesive compound, molding of magnet pieces by plastic, aluminum and the like.

Figure 6C:
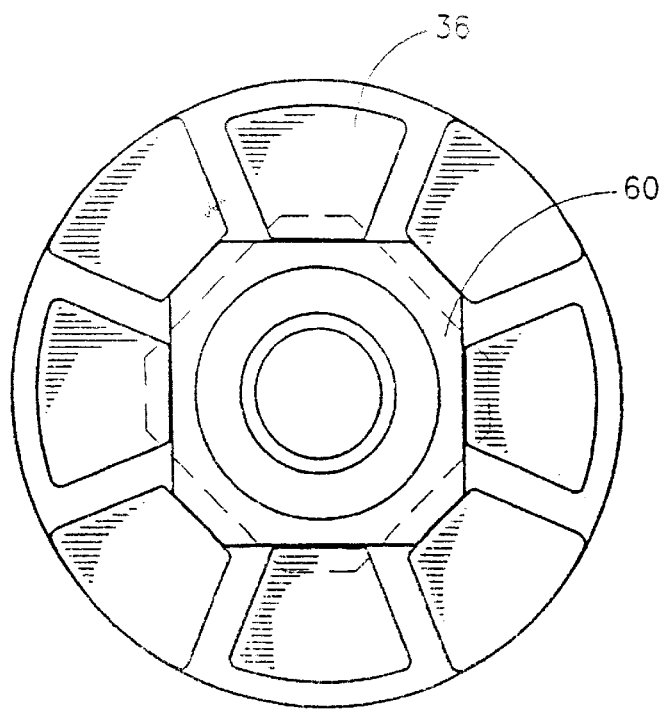
FIGS. 6c and 6d show top and cross-sectional views, respectively, of a rotor design based on an irregular polygonal hub.
Figure 6D:
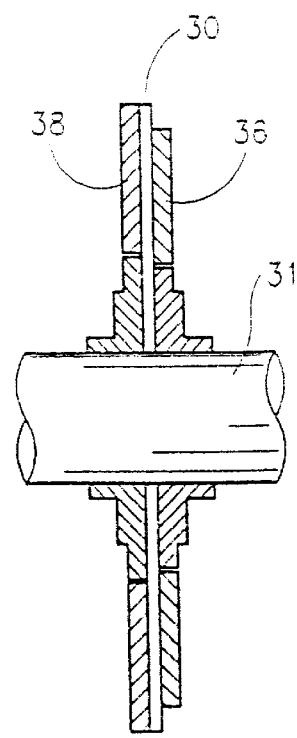
Figures 7A, 7B:
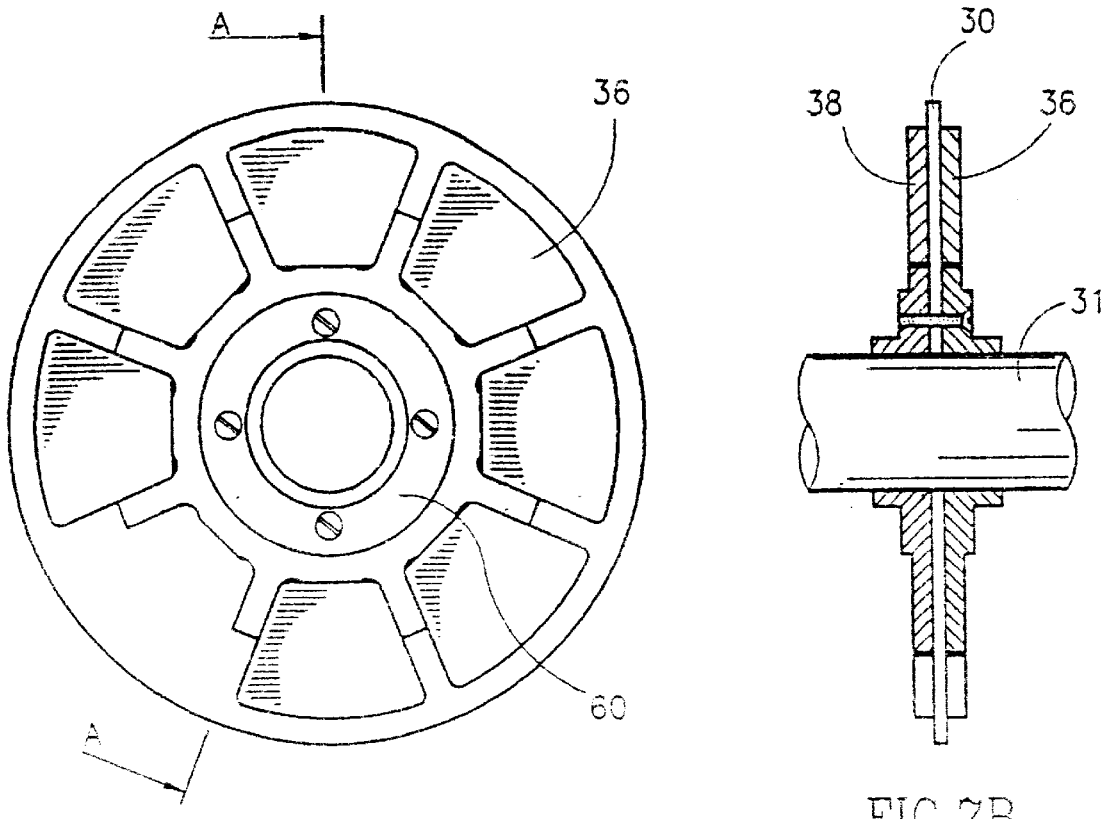
FIGS. 7a and 7b show top and cross-sectional views, respectively, of a rotor design based on star-type hub, with one of the magnet pieces not shown.

In order to increase the fatigue strength of central sheet 30, an irregular polygonal hub may be used (FIGS. 6c and 6d). In this case, adjoining magnetic pieces have inner boundaries which are at different radial distances from the center of the shaft which reduces the sheet's vulnerability to fatigue caused by repeated axial bending of the sheet as it rotates.

Figures 8A, 8B, 9, 10:
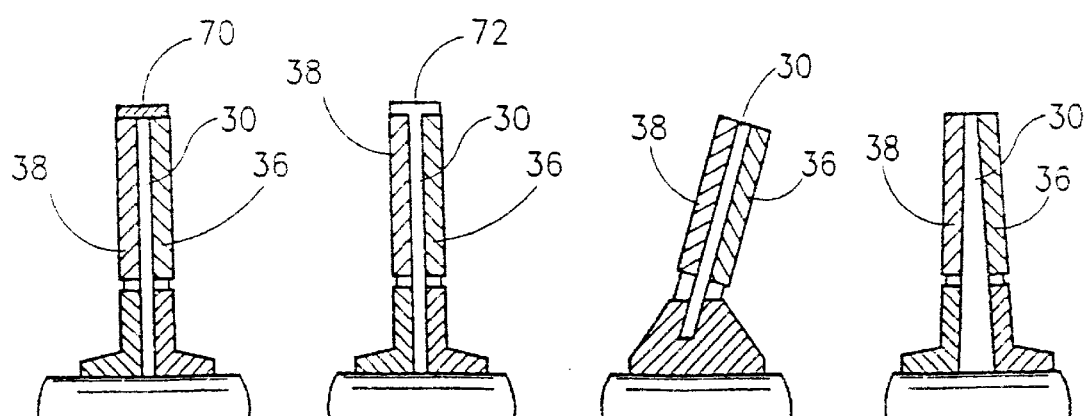
FIG. 8a is a cross-sectional view of a rotor design featuring a restraining ring.
FIG. 8b is a cross-sectional view of a rotor design featuring a central sheet which is enlarged at the periphery to better retain the magnetic pieces.
FIG. 9 is a cross-sectional view of a rotor having a central sheet which is not perpendicular to the shaft.
FIG. 10 is a cross-sectional view illustrating a rotor structure with variable central sheet thickness.

In order to prevent damage to the rotor, the rotor may be provided with a ring-shaped rim element 70 which surrounds the periphery of central sheet 30 and the magnetic pieces (FIG. 8a). Alternatively, central sheet 30 may be formed with a pair of axially-extending lips 72 which serve to confine the magnetic pieces and helps overcome the centrifugal force tending to force the magnetic pieces radially outward (FIG. 8b).

The basic principle of the present invention can be applied to various related electric machine contexts. For example, it can be utilized in rotors for cone-gap machines, for example, with cone of constant thickness (FIG. 9) or with perpendicular central sheet of variable thickness (FIG. 10).

Figure 11:
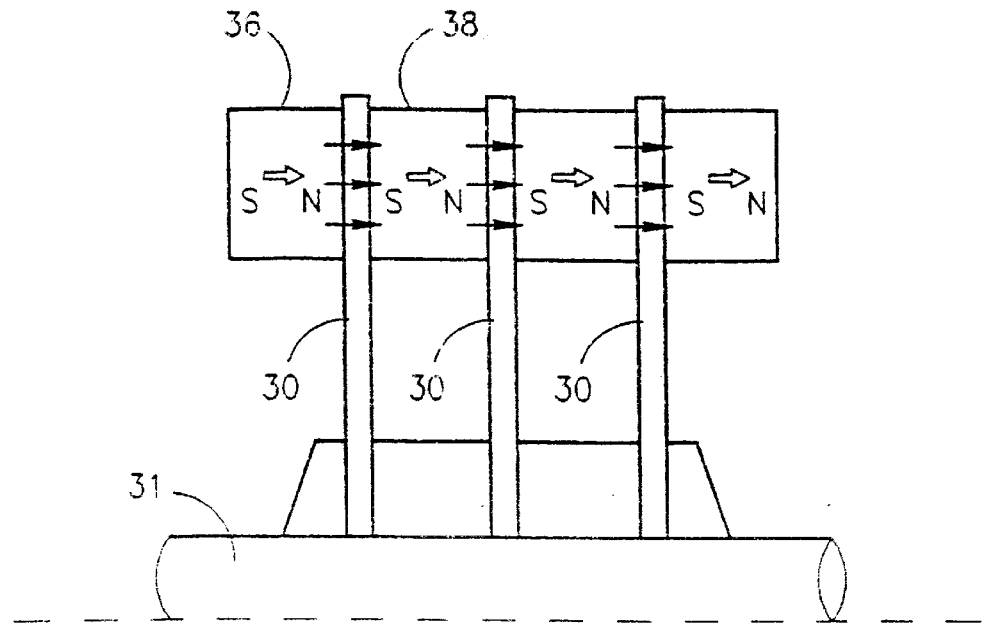
FIG. 11 is a cross-sectional view of a rotor having multiple central sheets.

While the present invention has thus far been described in terms of a single rotor, it will be understood that the present invention can be applied to a multi-rotor design, for example, as shown in FIG. 11. In such machines there is a common axial flux which is conducted by all the magnet layers both external and internal across thickness of all the central sheets.

Figure 12:
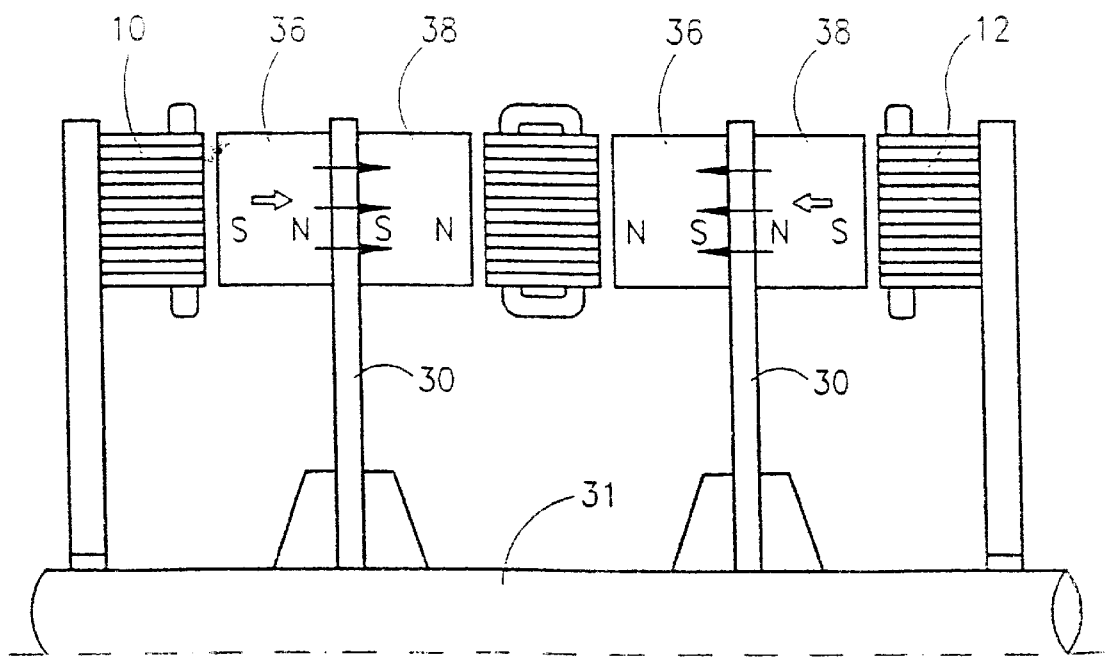
FIG. 12 is a cross-sectional of an electric machine featuring multiple rotors and stators.

It should also be understood that the described rotors can be utilized in multiple rotors and stators axial air-gap electric machines, for example, such as those of FIG. 12. In this case, a central stator 11 is rigidly connected to housing 15 using any suitable hanging mechanism 13, such as H-shaped braces attached to central stator 11 between its windings 21.

While the invention has been described with respect to a limited number of embodiments, it will be appreciated that many variations, modifications and other applications of the invention may be made.

What is claimed is:

1. A rotor for use in an electric machine, comprising:
   (a) a central member having a pair of opposing faces; and
   (b) at least one pair of permanent magnets, each of said at least one pair of permanent magnets including at least a pair of magnet pieces, said magnet pieces of said pair of permanent magnets being connected to said central member opposite from each other on opposing faces of said central member, said pair of magnet pieces characterized in that the polar orientation of said magnet pieces of said pair of permanent magnets is co-directional, said magnet pieces of said pair of permanent magnets being offset from each other.

2. A rotor as in claim 1, further comprising
   (c) a shaft connected to said central member.

3. A rotor as in claim 1, wherein said faces of said central member are substantially axially directed.

4. A rotor as in claim 1, wherein said polar orientation of said magnet pieces of said pair of permanent magnets is substantially axial.

5. A rotor as in claim 1, wherein said magnet pieces of said pair of permanent magnets are substantially opposite from each other.

6. A rotor as in claim 1, wherein at least one of said magnet pieces of said pair of permanent magnets includes a plurality of individual magnet pieces.

7. A rotor as in claim 1, wherein the rotor includes a plurality of pairs of magnet pieces and wherein overall magnetic fields of adjacent pairs of magnets are oppositely directed.

8. A rotor as in claim 1, wherein the rotor includes a plurality of pairs of magnet pieces and wherein overall magnetic fields of adjacent pairs of magnets are similarly directed.

9. A rotor as in claim 1, wherein said magnet pieces and said central member are connected through an adhesive.

10. A rotor as in claim 1, wherein said central member is connected to a central hub.

11. A rotor as in claim 10, wherein said magnet pieces and said hub are connected through an adhesive.

12. A rotor as in claim 10, wherein adjacent magnet pieces on one face of said central member are radially offset from each other.

13. A rotor as in claim 1, wherein adjacent magnets magnet pieces on one face of said central member are radially offset from each other.

14. A rotor as in claim 1, wherein said central member is a disk.

15. A rotor as in claim 1, further comprising a retaining member about a peripheral edge of said central member.

16. A rotor as in claim 1, wherein said central member is formed with a peripheral edge which extends substantially axially in both directions to aid in retaining said magnet pieces.

17. A rotor as in claim 1, wherein said opposing faces of said central member are substantially parallel.

18. A rotor as in claim 1, wherein said central member is made of magnetic conductive material.

19. A rotor for use in an electric machine, comprising:
   (a) a star-shaped central member having a pair of opposing faces; and
   (b) at least one pair of permanent magnets, each of said at least one pair of permanent magnets including at least a pair of magnet pieces, said magnet pieces of said pair of permanent magnets being connected to said central member opposite from each other on opposing faces of said central member, said pair of magnet pieces characterized in that the polar orientation of said magnet pieces of said pair of permanent magnets is co-directional.

20. A rotor for use in an electric machine, comprising:
   (a) a central member having a pair of opposing faces and having an axial thickness which varies radially; and
   (b) at least one pair of permanent magnets, each of said at least one pair of permanent magnets including at least a pair of magnet pieces, said magnet pieces of said pair of permanent magnets being connected to said central member opposite from each other on opposing faces of said central member, said pair of magnet pieces characterized in that the polar orientation of said magnet pieces of said pair of permanent magnets is co-directional.

* * * * *